United States Patent
Talwerdi

(10) Patent No.: US 10,755,059 B2
(45) Date of Patent: Aug. 25, 2020

(54) CERTIFICATION OF ITEMS

(71) Applicant: SICPA HOLDING SA, Prilly (CH)

(72) Inventor: Mehdi Talwerdi, British Columbia (CA)

(73) Assignee: SICPA HOLDING SA, Prilly (CH)

(*) Notice: Subject to any disclaimer, the term of this patent is extended or adjusted under 35 U.S.C. 154(b) by 249 days.

(21) Appl. No.: 15/569,304

(22) PCT Filed: Sep. 20, 2016

(86) PCT No.: PCT/EP2016/072256
§ 371 (c)(1),
(2) Date: Oct. 25, 2017

(87) PCT Pub. No.: WO2017/050736
PCT Pub. Date: Mar. 30, 2017

(65) Prior Publication Data
US 2018/0121691 A1    May 3, 2018

(30) Foreign Application Priority Data

Sep. 24, 2015 (EP) .................................. 15186653
Sep. 24, 2015 (EP) .................................. 15186695

(51) Int. Cl.
*G06K 7/10* (2006.01)
*G07D 7/00* (2016.01)
(Continued)

(52) U.S. Cl.
CPC ......... *G06K 7/10564* (2013.01); *G06F 21/33* (2013.01); *G06F 21/64* (2013.01);
(Continued)

(58) Field of Classification Search
CPC .... G06K 7/10564; G06K 7/1099; G06K 7/00; G06K 1/121; G06K 9/00577;
(Continued)

(56) References Cited

U.S. PATENT DOCUMENTS 5,267,756 A * 12/1993 Molee .................... G09F 3/0292
283/74
5,380,047 A * 1/1995 Molee .................... G06K 19/16
283/74
(Continued)

FOREIGN PATENT DOCUMENTS

| EA | 200100193 | 10/2001 |
| RU | 2132569 | 6/1999 |
| WO | 2006010019 | 1/2006 |
| WO | 2015058948 | 4/2015 |

OTHER PUBLICATIONS

International Search Report and Written Opinion issued with respect to application No. PCT/EP2016/072256.
(Continued)

*Primary Examiner* — Daniel I Walsh
(74) *Attorney, Agent, or Firm* — Muncy, Geissler, Olds & Lowe, P.C.

(57) ABSTRACT

The present invention relates to systems, entities, and methods for certificates and certifications of documents, such as passports, licenses, degree certificates, and the like. More specifically, the present invention relates to re-certifying a document in the sense of verifying and/or renewing an already existing certificate/certification.

10 Claims, 1 Drawing Sheet

(51) Int. Cl.
| | | |
|---|---|---|
| G06K 1/12 | (2006.01) | |
| G06K 19/06 | (2006.01) | |
| G06F 21/64 | (2013.01) | |
| H04L 9/08 | (2006.01) | |
| H04L 9/32 | (2006.01) | |
| G06F 21/33 | (2013.01) | |
| G06K 9/00 | (2006.01) | |

(52) U.S. Cl.
CPC ........... *G06K 1/121* (2013.01); *G06K 7/1099* (2013.01); *G06K 9/00577* (2013.01); *G07D 7/00* (2013.01); *H04L 9/0891* (2013.01); *H04L 9/3265* (2013.01); *G06K 2009/0059* (2013.01); *G06K 2019/06225* (2013.01); *H04L 2209/608* (2013.01)

(58) Field of Classification Search
CPC . G06K 2009/0059; G06F 21/64; G06F 21/33; H04L 9/0891; H04L 9/3265; H04L 2209/608; G07D 7/00
See application file for complete search history.

(56) References Cited

U.S. PATENT DOCUMENTS

| | | | | |
|---|---|---|---|---|
| 6,308,165 | B1* | 10/2001 | Gilham | G06Q 20/367 705/62 |
| 6,612,494 | B1* | 9/2003 | Outwater | B41M 3/14 235/462.01 |
| 7,046,828 | B1* | 5/2006 | Gibbs | G06Q 30/00 382/119 |
| 7,314,162 | B2 | 1/2008 | Carr et al. | |
| 7,503,488 | B2 | 3/2009 | Davis | |
| 8,345,315 | B2* | 1/2013 | Sagan | H04N 1/32154 358/3.28 |
| 9,947,015 | B1* | 4/2018 | Vildosola | G06K 9/00671 |
| 2001/0041214 | A1* | 11/2001 | Brogger | G07F 7/12 427/8 |
| 2002/0063744 | A1* | 5/2002 | Stephens, Jr. | G06K 19/0614 347/19 |
| 2002/0122574 | A1* | 9/2002 | Morgan | G06K 9/00154 382/119 |
| 2002/0178363 | A1* | 11/2002 | Ambrogio | H04N 1/32101 713/176 |
| 2003/0015867 | A1* | 1/2003 | Petkovsek | B42D 15/00 283/81 |
| 2003/0121984 | A1* | 7/2003 | Pinchen | B42D 25/29 235/487 |
| 2003/0156294 | A1* | 8/2003 | D'Agraives | G06K 9/00577 356/450 |
| 2003/0163696 | A1* | 8/2003 | Rancien | G07C 9/00079 713/170 |
| 2003/0191694 | A1* | 10/2003 | Vonfeldt | G06F 21/10 705/26.1 |
| 2004/0026502 | A1* | 2/2004 | Tame | G06Q 20/3552 235/382 |
| 2004/0061913 | A1* | 4/2004 | Takiguchi | H04N 1/32609 358/524 |
| 2004/0093497 | A1* | 5/2004 | Arangio | G06Q 20/389 713/176 |
| 2004/0123565 | A1* | 7/2004 | Rice | B65B 5/103 53/415 |
| 2004/0188528 | A1* | 9/2004 | Alasia | G07D 7/004 235/468 |
| 2005/0216360 | A1* | 9/2005 | Osterer | G06Q 30/06 705/26.1 |
| 2005/0243199 | A1 | 11/2005 | Bohaker et al. | |
| 2005/0289061 | A1* | 12/2005 | Kulakowski | G06Q 99/00 705/50 |
| 2006/0072822 | A1* | 4/2006 | Hatzav | G03B 15/00 382/181 |
| 2006/0131402 | A1* | 6/2006 | Crockett | G06Q 20/20 235/383 |
| 2006/0239516 | A1* | 10/2006 | Morgan | G06K 9/00154 382/119 |
| 2006/0268352 | A1* | 11/2006 | Tanigawa | G06F 16/93 358/403 |
| 2007/0028093 | A1* | 2/2007 | Cowburn | G06K 9/00577 713/155 |
| 2007/0155510 | A1* | 7/2007 | Galvin | G06F 21/64 463/43 |
| 2007/0251991 | A1* | 11/2007 | Wilk | G06Q 20/04 235/379 |
| 2008/0002243 | A1* | 1/2008 | Cowburn | G06K 7/14 358/498 |
| 2008/0078826 | A1* | 4/2008 | Siebers | A63B 43/00 235/375 |
| 2008/0177405 | A1* | 7/2008 | Galvin | A47F 9/048 700/94 |
| 2008/0181447 | A1* | 7/2008 | Adams | G09F 3/00 382/100 |
| 2009/0307529 | A1* | 12/2009 | Kim | G06K 1/121 714/37 |
| 2010/0073128 | A1* | 3/2010 | Talwerdi | G06K 9/00 340/5.8 |
| 2010/0237983 | A1* | 9/2010 | Tredoux | G06F 3/0425 340/5.1 |
| 2010/0266163 | A1* | 10/2010 | Evevsky | G06K 9/036 382/112 |
| 2011/0128360 | A1* | 6/2011 | Hatzav | G03B 15/00 348/61 |
| 2011/0135160 | A1* | 6/2011 | Sagan | G07D 7/12 382/108 |
| 2011/0283369 | A1* | 11/2011 | Green | G06K 19/10 726/30 |
| 2012/0226600 | A1* | 9/2012 | Dolev | G06K 9/6203 705/38 |
| 2013/0142440 | A1* | 6/2013 | Hirayama | G07D 7/128 382/212 |
| 2014/0062652 | A1* | 3/2014 | Roberson | H04W 12/06 340/5.8 |
| 2014/0175165 | A1* | 6/2014 | Havens | G06Q 50/22 235/375 |
| 2015/0028227 | A1* | 1/2015 | Pawlik | G06K 19/06112 250/461.1 |
| 2015/0028578 | A1* | 1/2015 | Pawlik | G06K 7/12 283/67 |
| 2015/0083801 | A1* | 3/2015 | Soborski | G06K 19/06056 235/375 |
| 2015/0127507 | A1* | 5/2015 | Hall | G06Q 40/04 705/37 |
| 2016/0080589 | A1* | 3/2016 | Talwerdi | G07C 9/00087 358/1.12 |
| 2016/0239934 | A1* | 8/2016 | Soborski | G06T 1/0042 |
| 2016/0247341 | A1* | 8/2016 | Talwerdi | B42D 9/04 |
| 2016/0371303 | A1* | 12/2016 | Voigt | G06F 17/30277 |
| 2017/0083731 | A1* | 3/2017 | Sanwald | G06K 9/00577 |
| 2017/0091502 | A1* | 3/2017 | Furlong | G06K 7/12 |
| 2017/0091505 | A1* | 3/2017 | Chamandy | G06K 1/121 |
| 2017/0109875 | A1* | 4/2017 | Shevchenko | G06T 7/0004 |
| 2017/0193525 | A1* | 7/2017 | Shah | H04L 63/02 |
| 2017/0195515 | A1* | 7/2017 | Dolev | H04N 1/32133 |
| 2017/0287147 | A1* | 10/2017 | Takahashi | G06T 7/0004 |
| 2018/0004997 | A1* | 1/2018 | Furlong | G06K 7/10831 |
| 2018/0018836 | A1* | 1/2018 | Fankhauser | G07C 9/00087 |
| 2018/0018837 | A1* | 1/2018 | Fankhauser | G07C 9/00087 |
| 2018/0018838 | A1* | 1/2018 | Fankhauser | G06K 19/06046 |
| 2018/0121691 | A1* | 5/2018 | Talwerdi | G06F 21/64 |
| 2018/0170804 | A1* | 6/2018 | Witzmann | C03B 23/04 |
| 2018/0286035 | A1* | 10/2018 | Kozicki | G06T 7/0008 |

OTHER PUBLICATIONS

Eurasian Office Action in counterpart Eurasian Application No. EA201792129 dated Feb. 21, 2020 (and English language translation of the Office Action), 4 pages.

* cited by examiner

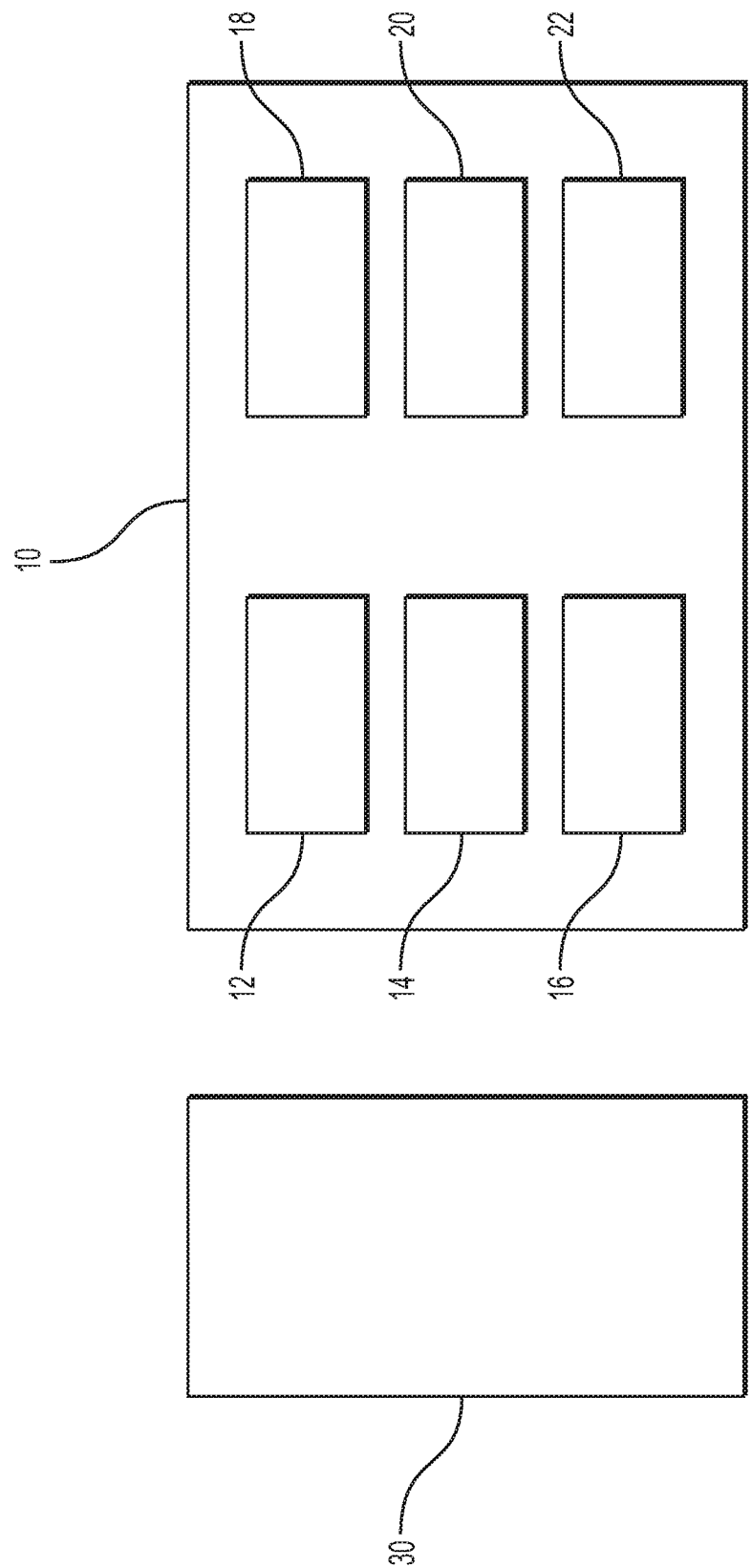

CERTIFICATION OF ITEMS

TECHNICAL FIELD

The present invention relates to systems, entities, and methods for certification of items such as documents, passports, licenses, degree certificates, and value items such as pieces of art and the like. More specifically, the present invention relates to re-certifying a item/document in the sense of verifying and/or renewing an already existing certificate/certification.

BACKGROUND

The publication U.S. Pat. No. 7,314,162 discloses a method and system for reporting identity document usage by storing in a database and reporting to an identity document owner instances in which that person's driver's license, passport or other government-issued identification documents are presented as a form of ID, thereby facilitating early notification of identity theft.

Further, the publication U.S. Pat. No. 7,503,488 discloses a method of assessing the risk of fraud before issuing a driver's license to an applicant on the basis of the relative incidence of fraud historically associated with the particular combination of collateral identification documents (e.g. birth certificate, passport, student ID card, etc.) presented by the applicant in their application for the driver's license.

It is desirable to re-certify, correct and/or update official (i.e. government-issued) cards or other certificates (e.g. birth certificate), educational degrees and diplomas, and other certificates, etc., especially those that do not have an inherent expiry or renewal date. It may be further desirable to print a certification mark on a commercial document for authentication purposes.

It is further desirable to mark items such as pieces (works) of art and other items of value ("value items") with a certification mark without devaluing the value item (e.g. without altering the visual appearance of a work of art). It is further desirable to employ existing infrastructure to most efficient extent in that specific reader-printer(s) are commercially available for use to print on documents such as passports.

It is an object of the present invention to provide a system and method addressing these needs and solving the drawbacks from the prior arts.

SUMMARY

The above mentioned problems and drawbacks of the conventional concepts are solved by the subject-matter of the embodiments of the present invention.

BRIEF DESCRIPTION OF THE DRAWINGS

The sole FIGURE illustrates a special-purpose server and a specific printer or integrated reader-printer, according to an embodiment of the present invention.

DETAILED DESCRIPTION

Cards and certificates can be re-issued to make corrections or to update their security features, and the old cards or certificates surrendered for destruction. Some cards and certificates can show an expiry date and require periodic renewal (e.g. passport, driver's license, etc.). Specific reader-printers are commercially available for use to print re-issues of cards and certificates.

With reference to the sole FIGURE, an embodiment of the present invention includes a special-purpose server 10 that comprises one or more of an application server 12, a data collection module 14, an analytics module 16, an alert module 18, a firewall & anti-tamper module 20, and/or a secure communications module 22. Said application server 12 may provide privately owned cloud-based operational control of a reader, printer and/or integrated reader-printer, whichever may be installed, and other administrative functions, thereby relieving the burden of integrating a reader-printer into existing third-party electronic systems.

The data collection module 14 collects and stores in a database all data permitted by national law (e.g. privacy laws) that is associated with each use or selected uses of a passport or other value item, including: (i) scans of the value item by reader or integrated reader-printer, including multiple scans at multiple wavelengths of electromagnetic radiation, ultrasound scans (e.g. of liquid value items), x-ray scans, laser scans; (ii) value item identification such as a passport number, image(s) or other identification of the passport and its contents, including position within a given passport of any prior official (e.g. Visa) stamps in that given passport; (iii) biometric and biographic data of the value item holder or owner, such as fingerprints, eye scans, facial scans, body scans, infrared heat sensor data, audiovisual recordings (described further below), etc.; (iv) date, time and location of each use or selected uses of the value item, including for example whenever a passport is scanned at a passport scanning facility such as a border crossing, transportation hub such as at airports, ship docks and train stations, or at banks, hotels, etc., or whenever a value item is scanned at a scanning facility (i.e. a facility having a reader or integrated reader-printer); (v) sound, image or video recordings of interactions between passport holders and officials at a passport scanning facility or other recordings related to use of the value item, associated media metadata (e.g. number of frames recorded, frequency signatures of voice or other recorded data) and metrics calculated from such media metadata (e.g. which can be encrypted and employed to complement existing anti-tampering technologies); (vi) video data showing persons using the passport or other value item; (vii) travel information associated with the value item holder or owner, e.g. arrival and/or destination information, such as an airline flight no. associated with a passport being scanned at an airport or other passport scanning facility; (viii) medical information (e.g. health status, prior exposure to communicable diseases, medical reports, etc., associated with a passport holder, individual (e.g. refugee) present at an official data collection facility, or value item owner; (ix) related documentation, such as a scan of customs forms, scans of secondary identification documents, notes by officials involved, etc. (x) identity of the responsible Officer involved with handling a passport or other value item, such as where the Officer is identified by fingerprint using the reader-printer, if installed, or other biometric for example; and (xi) RFID contents where a RFID chip is installed in a passport, label or sticker (e.g. affixed to an object) or value item and scanned at the (passport) scanning facility. The database may also store information related to Visa, national entry, national exit, custom form, passport stamps or other official stamps for use in centrally (i.e. remotely) controlling a reader, printer and/or integrated reader-printer, whichever may be installed.

The analytics module 16 analyzes the data stored in the database to determine, in real-time, potentially irregular use of a passport or other value item, such as where an entry into or exit from a country is being attempted by a passport holder without a corresponding preceding exit or entry, or where a value item holder is exhibiting notable behavioral patterns such as nervousness. The analytics module 16 also monitors databases of INTERPOL, Europol, national criminal record databases, and other databases to identify individuals of interest who are attempting to use a passport at a passport scanning facility or other value item at a scanning facility. The analytics module 16 monitors length-of-stay restrictions to issue an alert if a passport holder has an overstay (e.g. has not exited a country by the expiry date of their Visa) or has an understay (e.g. has not stayed a sufficient amount of time in a country to qualify for a specifiable immigration status).

The alert module 18—The alert module 18 alerts the responsible Officer or other official when the passport or other value item scanned by the Officer has been flagged by the analytics module as being associated with irregular use or otherwise problematic. Alerts are also generated when tampering or other physical damage to the Special-purpose Server 10 or module thereof is detected. Alerts may be provided via the secure communications module (described below), and/or by email, text and/or voice message (e.g. to a mobile telephone), etc. to the responsible Officer or other official. Alerts may be provided to any official agency worldwide, as permitted by law, for the purposes of proactive security.

The firewall & anti-tamper module 20 protects the special-purpose Server 10 from external, Internet-based attacks, and also monitors for physical tampering, intrusion or other damage to the special-purpose hardware components.

The secure communications module 22 provides encryption for communications between the Special-purpose Server 10 and electronic systems of participating national governments, agencies thereof, commercial enterprises, or other customers, using encryption techniques consistent with customer preferences and legal requirements. The secure communications module 22 facilitates communications between the Special-purpose Server 10 and the client computers, including specific readers, printers and/or integrated reader-printers, at (passport) scanning facilities. The secure communications module 22 is operable to communicate with client computers within each country via a country-specific VPN (Virtual Private Network). In some embodiments, a separate VPN for each (passport) scanning facility is employed. Country-specific communications facilitate the transfer of information between countries (within the limits of both country's laws) via the Special-purpose Server 10, despite incompatibility between respective passport-related electronic systems of different countries. More generally, the secure communications module 22 facilitates the transfer of information between subscribing customers despite incompatibilities between their respective systems by receiving data from a first subscribing customer in accordance with a first communication protocol and then transmitting data from the Special-purpose Server 10 to a second subscribing customer in accordance with a second communication protocol wherein the first and second communication protocols are not necessarily compatible with each other.

Any number of modules of the special-purpose server 10 may be integrated into a customized black-box unit, and any given module may be commercialized as a stand-alone unit suitable for integrating with existing third-party electronic systems.

A specific printer or integrated reader-printer 30, may be either directly controlled as a stand-alone unit or centrally controlled by the special-purpose server 10 to print re-certification marks on official cards and certificates, thereby printing corrective information and/or employing newer security features. By way of example, an official card or certificate that is accepted as authentic may be scanned by a reader or integrated reader-printer 30, the scan results may be stored by the special-purpose server 10 in its database, a certification mark is generated on the basis of a selected template and dynamic field data (which optionally includes coded data produced on the basis of the scan results); and the certification mark is printed on the official card or certificate.

In the case of event tickets or other purchased tickets for commercial services (e.g. transportation tickets), using the Reader-Printer 30 to stamp or otherwise print on the ticket to indicate that it has already been used allows the use of security features (e.g. security features incorporated into the ink used for printing). Making the printed stamp visible inhibits improper re-use of such tickets by others.

By way of further example, a bill of lading that is accepted as authentic prior to use displays information describing the goods (e.g. quality standard, quantity, etc.) to be shipped. Such information from the bill of lading is encrypted and a certification mark is generated containing the encrypted information. The certification mark is printed on the bill of lading by the printer or integrated Reader-Printer 30 prior to shipping. At the destination, the bill of lading and goods actually contained in the shipped container are compared. If any discrepancy is found, the encrypted data of the certification mark is decrypted and compared to the information displayed on the bill of lading to determine whether the bill of lading was altered (e.g. tampered) during shipment. Additionally or alternatively, the decrypted information may be compared to the received goods.

As a further example, bundles of cash money may be held together by a paper wrap having printed thereon, by the printer or integrated reader-printer 30 prior to transporting, storing, etc., a certificate containing an encrypted indication of the amount of money in the bundle.

In variations, multiple certification marks can be printed at multiple locations which may be random locations or human-selected locations etc.

As an optional step, an image of the value item having the certification mark(s) applied thereto can be taken (e.g. by a Reader-Printer 30 internal camera) and then stored by the Special-purpose Server 10 for subsequent use in determining whether tampering of the certification mark(s) has occurred. By way of example, where multiple certification marks are placed at randomly selected locations (e.g. within specifiable boundaries) the relative or absolute locations of the certification mark(s) may be subsequently verified. In a variation, the object having the certification mark(s) applied thereto is scanned by the reader or integrated reader-printer 30 and the scan results are stored by the Special-purpose Server 10 for subsequent authentication of the value item and its certification mark(s).

According to another embodiment of the present invention, modifications to the mechanics are provided so that the reader-printer 30 can be adapted to support printing on objects of various shapes and sizes. For example, a specific reader/printer 30 may be a portable, handheld unit for scanning objects of various shapes and sizes.

According to method of operation embodiments of the present invention, a value item that is accepted as authentic is optionally scanned and the scanned data is stored by the special-purpose server 10; a certification mark is generated on the basis of a selected template and dynamic field data (which optionally includes coded data produced on the basis of the scan results); and the certification mark is printed on the value item using non-penetrating, non-absorbing ink that is visible only under exposure to specifiable electromagnetic radiation (e.g. ultraviolet light).

In variations, multiple certification marks can be printed at multiple locations which may be random locations or human-selected locations etc. By way of example, certification marks on the backside of a painting at the juncture between the backside of the canvas and the frame may be employed. Such backside certification marks need not be invisible for example.

In a variation, a scan of the value item having the certification mark(s) applied thereto can be taken by the reader or integrated reader-printer 30 at selected wavelengths of electromagnetic radiation and then stored by the Special-purpose Server 10 for subsequent use in determining whether tampering of the certification mark(s) has occurred. By way of example, where multiple certification marks are placed at randomly selected locations (within specifiable boundaries) the relative or absolute locations of the certification mark(s) may be subsequently verified.

Although detailed embodiments have been described, these only serve to provide a better understanding of the invention defined by the independent claims, and are not to be seen as limiting.

The invention claimed is:

1. A system comprising a reader-printer for re-certifying a value item and a special-purpose server including a data collection module, said reader-printer being controlled by the special-purpose server, the system being configured to:
   scan by the reader-printer the value item being accepted as authentic;
   store by the special-purpose server in an electronic database of the data collection module a result of scanning the value item by the reader-printer;
   generate at least one certification mark comprising an electronically coded data produced on a basis of the result of scanning the value item stored in the electronic database;
   print by the reader-printer the generated at least one certification mark on the value item;
   scan by the reader-printer the value item having the generated at least one certification mark printed thereon; and
   store the scan of the value item having the generated at least one certification mark printed thereon by the special-purpose server in the electronic database for subsequent authentication of the value item and the at least one certification mark,
   wherein the reader-printer is further configured to print multiple certification marks at multiple locations on the value item and the special-purpose server is configured to store in the electronic database the scan of the value item having the generated certification marks printed thereon at the multiple locations so as a corresponding relative or absolute location of at least one of the generated certification marks printed at the multiple locations on the value item can be subsequently verified as part of the authentication of the value item, and wherein the authentication of the value item is performed by the special-purpose server.

2. The system of claim 1, wherein the reader-printer is further configured to print on a document including any one of a passport, a license, a degree certificate, and a card.

3. The system of claim 1, wherein the reader-printer is further configured to print on objects of various shapes and sizes.

4. The system of claim 3, wherein the reader-printer is further configured to print at least one of the generated certification marks on the value item using non-penetrating and/or non-absorbing ink that is visible only under exposure to specifiable electromagnetic radiation, preferably ultraviolet light.

5. The system of claim 1, wherein the multiple locations are random locations or human-selected locations.

6. The system of claim 1, wherein the scan of the value item having the generated certification marks printed thereon is taken at selected wavelengths of electromagnetic radiation.

7. The system of claim 1, wherein the reader-printer is handheld.

8. The system of claim 1, wherein the special-purpose server further includes one or more of an application server, an analytics module, an alert module, a firewall and anti-tamper module, and/or a secure communications module.

9. The system of claim 8, wherein the secure communications module is configured to provide encryption for communications between the special-purpose server and the reader-printer.

10. The system of claim 8, wherein the application server is configured to provide privately owned cloud-based operational control of the reader-printer.

* * * * *